(12) United States Patent
Perry et al.

(10) Patent No.: US 7,976,306 B2
(45) Date of Patent: Jul. 12, 2011

(54) DEVICES AND METHODS FOR HEATING PIPES OR TUBING

(76) Inventors: Warren Keith Perry, Gainesville, FL (US); Alicia Kemper, Gainesville, FL (US)

(*) Notice: Subject to any disclaimer, the term of this patent is extended or adjusted under 35 U.S.C. 154(b) by 623 days.

(21) Appl. No.: 11/868,103

(22) Filed: Oct. 5, 2007

(65) Prior Publication Data
US 2009/0092941 A1    Apr. 9, 2009

(51) Int. Cl.
*F16L 53/00*    (2006.01)
(52) U.S. Cl. .......................... 432/225; 138/35
(58) Field of Classification Search .............. 432/225, 432/224, 227; 138/32, 35
See application file for complete search history.

(56) References Cited

U.S. PATENT DOCUMENTS

| | | | | |
|---|---|---|---|---|
| 1,283,125 A * | 10/1918 | Ewers | | 432/63 |
| 2,366,088 A * | 12/1944 | Coody | | 432/123 |
| 3,402,447 A * | 9/1968 | Mettler | | 28/223 |
| 3,466,020 A * | 9/1969 | Blinne | | 432/88 |
| 4,239,486 A | 12/1980 | Gomez | | |
| 4,254,821 A | 3/1981 | Matsuda et al. | | |
| 4,255,137 A * | 3/1981 | Guyer | | 432/225 |
| 4,437,453 A | 3/1984 | Temple et al. | | |
| 4,449,925 A * | 5/1984 | Williams et al. | | 432/225 |
| 4,620,645 A | 11/1986 | Hale | | |
| 4,812,076 A | 3/1989 | Yant | | |
| 5,685,288 A * | 11/1997 | Sibley et al. | | 126/229 |
| 5,853,289 A * | 12/1998 | Todd et al. | | 432/225 |
| 6,033,213 A * | 3/2000 | Halvorsen, Jr. | | 432/225 |
| 6,257,880 B1 * | 7/2001 | Hirayama | | 432/225 |
| 6,561,797 B1 * | 5/2003 | Johnson | | 432/225 |
| 6,971,872 B1 * | 12/2005 | Jimenez | | 432/225 |
| 7,133,606 B1 * | 11/2006 | Elliott et al. | | 392/411 |

FOREIGN PATENT DOCUMENTS

| | | | |
|---|---|---|---|
| JP | 56098132 A * | 8/1981 | |
| JP | 11050413 | 2/1999 | |
| JP | 2004332378 | 11/2004 | |

OTHER PUBLICATIONS www.thomasregister.com/olc/72793995/7a.htm.
www.e-asphalt.com/ingles/heaters/index.htm.
www.sta-warm.com/pipe.htm.

* cited by examiner

*Primary Examiner* — Gregory A Wilson
(74) *Attorney, Agent, or Firm* — Saliwanchik, Lloyd & Eisenschenk (57) ABSTRACT

The subject invention provides devices and methods for heating pipes, tubing or similar equipment. More specifically, the subject invention pertains to devices and methods for heating pipes, tubing or similar equipment to melt-out blockages, such as for example, bitumen blockages.

15 Claims, 5 Drawing Sheets

DEVICES AND METHODS FOR HEATING PIPES OR TUBING

BACKGROUND OF INVENTION

The residential and commercial roofing industry in the United States is a billion dollar industry annually. The majority of this demand is in non-residential construction, particularly office/commercial space and institutional construction. There are a variety of roofing techniques and procedures that can be used for such structures, depending upon environmental conditions, building construction, costs, and availability of materials.

One of the most common types of non-residential roofing construction is built-up roofing (BUR), also known as low-slope roofing. Historically, BUR systems have been popular because of their proven stability and reliability. BUR structures over 30-40 years old in excellent condition are not uncommon. BUR is also easy to install and maintain, relatively inexpensive, and widely available. For this reason, it is expected to be widely popular for many years to come.

BUR usually comprises multiple layers of coal tar pitch or asphalt, referred to as "bitumen", spread between multiple plies of roofing sheets or felts. Bitumen is a solid or semi-solid material that is usually melted and applied to saturate and seal multiple plies or felts across a roof surface. The melting of bitumen is often done on-site utilizing any of a variety of specially designed kettles or pots. The melted bitumen is often pumped from a kettle to a roof top through a series of joined pipe segments, usually referred to as "thinwall tubing", rising to a roof top where it is expelled and spread across the roof.

The optimal melting temperatures of bitumens vary with each type of material. For example, asphalt, a solid material, has a melting point between approximately 54° C. to 173° C. and an auto-ignition point of >400° C. The optimal working temperature of asphalt is approximately 300°. In contrast, coal tar pitch, a thick paste material, will become more liquid at temperatures between approximately 30° C. to 180° C. and has an auto-ignition point of >500° C. The optimal working temperature of coal tar pitch is similar to that of asphalt.

Thus, when the temperature of these materials falls below the melting or liquid point they can begin to solidify or thicken, which can block or clog the transfer pipes. Once the pipes become blocked, they must be disassembled and cleaned or "melted-out" before they can be used again to transfer material. The longer the melted bitumen stays within the transfer pipes, the greater the chance of transfer pipes becoming blocked as the bitumen cools. It is not uncommon for transfer pipes to become blocked numerous times during a roofing installation.

The current techniques for melting-out blocked pipes or thinwall tubing are often time-consuming and energy inefficient and can slow down roofing installation and raise overall costs. For example, the most common technique uses an industrial blow-torch to heat the length of the tubing in order to re-melt the solidified or thickened material within. The efficiency of this method depends upon a variety of factors, including the number of people and blow-torches available to melt-out the tubing, the skill of the person(s) using the blow torch, the severity of the blockage, the number of blocked thinwall tubes, and the length of the pipe(s), etc.

The subject invention provides devices and methods for more efficiently melting-out clogged or blocked thinwall tubing. The devices and methods of the subject invention can be used at almost any location, including on-site of a roofing project, and, in certain embodiments, are capable of simultaneously melting-out a plurality of tubes or similar equipment.

BRIEF SUMMARY

The devices and methods of the subject invention provide efficient systems for heating pipes, tubing, or similar equipment. In particular, the subject invention provides devices and methods for heating pipes, tubing or similar equipment to melt-out material or objects causing an obstruction therein. More particularly, the subject invention provides devices and methods for heating pipes, tubing, or similar equipment that are blocked with asphalt or coal tar pitch (i.e., bitumens), so as to melt the materials sufficiently for evacuation to clear the blockage. The devices and methods of the subject invention can be utilized in almost any location, but are particularly useful on-site of a roofing installation.

In a first embodiment, a kettle, i.e., roofing kettle, can be modified with channels into which thinwall tubing can be placed. The melted bitumen within the kettle surrounds the kettle channels and the radiant heat therein heats the tubing or similar equipment causing the solidified or thickened material therein to melt-out one or both ends of the pipe or similar equipment. In a further embodiment the kettle channels are slanted to facilitate flow of the melted-out material.

A second embodiment comprises a pipe oven device into which can be inserted one or more pipes, thinwall tubing, or similar equipment. The pipe oven device can be heated by any of a variety of methods. In this embodiment, one or more blocked pipes, tubes, or similar apparatuses inserted within the oven, can be heated until a blockage therein is melted-out.

A third embodiment utilizes a pipe sleeve that can be connected to a blow-torch burner head, or other heat-generating device. The pipe sleeve is capable of confining and more evenly distributing the heat from a burner head or other heat source around and along a length of pipe, thinwall tubing, or similar apparatus causing a larger area to be heated for more efficient melting-out. In a further embodiment, the sleeve can accommodate multiple pipes, tubes, etc.

Other features and advantages of these embodiments will be apparent from the following description and figures. The preferred embodiments will also be set forth in sufficient detail.

BRIEF DESCRIPTION OF DRAWINGS

In order that a more precise understanding of the above recited devices and methods be obtained, a more particular description will be rendered by reference to specific embodiments thereof that are illustrated in the appended drawings. Understanding that these drawings depict only typical embodiments of the invention and are not therefore to be considered as limiting in scope, the invention will be described and explained with additional specificity and detail through the use of the accompanying drawings in which:

FIGS. 1H-1, 1H-2, 1H-3 and 1H-4 illustrate alternative embodiments of sleeve struts that can be utilized with embodiments of the pipe sleeve of the subject application. Shown are different types of flanges that can be used with the pipe sleeve embodiments of the subject invention.

DETAILED DISCLOSURE

The subject invention provides several devices and methods for heating pipes, tubing or similar apparatuses. More specifically, the subject invention pertains to devices and methods for heating pipes, tubing or similar apparatuses in order to melt-out blockages, such as for example, bitumen blockages within the pipes, tubing, etc.

The following description will disclose that the subject invention is particularly useful in the roofing industry, in particular, the area of built-up roofing that utilizes various types of bitumens, or similar material, as a sealant. However, a person with skill in the art and having benefit of the subject disclosure will be able to recognize numerous other uses that are applicable to the devices and methods of the subject invention. Such modifications and alternative uses are contemplated to be within the scope of the present invention.

It should here be stated that while the following description is with respect to the roofing industry, this invention may also be used in other locations and for other purposes that may also involve clearing pipes or other tubular apparatuses of material other than bitumen products.

Consequently, this invention can be used in industrial or business applications other than those disclosed herein. In any event, this invention can be used wherever it may be necessary to heat pipes or other types of tubular apparatuses, or to clear such pipes and similar apparatuses of meltable materials. It need not be limited solely to the melting-out of bitumen from thinwall tubing.

The terms "pipe" or "piping" as used in the subject application are merely for literary convenience. The terms should be construed to include any of a variety or number of conduits, such as tubes or tubing, including thinwall tubing, cylindrical or otherwise, similar equipment or devices, or related structures and should not be construed as limiting in any way. The devices, apparatuses, methods, techniques and/ or procedures of the subject invention could be utilized with a variety of one or more objects or equipment by any person desiring or needing to do so and having the necessary skill and understanding of the invention.

Also, as used herein, and unless otherwise specifically stated, the terms "operable communication" and "operably connected" mean that the particular elements are connected in such a way that they cooperate to achieve their intended function or functions. The "connection" may be direct, or indirect, physical or remote.

In addition, references to "first", "second", and the like (e.g., first and second channels), as used herein, and unless otherwise specifically stated, are intended to identify a particular feature of which there are at least two. However, these references are not intended to confer any order in time, structural orientation, or sidedness (e.g., left or right) with respect to a particular feature.

With reference to the attached figures, which show certain embodiments of the subject invention, the following description will provide details of various embodiments of the invention.

I. Pipe Sleeve

One embodiment of the subject invention comprises a pipe sleeve 10 that is capable of being placed around some portion of a length of pipe 11. The pipe sleeve 10 can be operably connected to any of a variety of heat sources, via one or more heat ports 18 to which can be further affixed one or more port chimneys 12. The pipe sleeve 10 can be moved along the length of a pipe to allow the heat entering through the chimney 18A to heat the pipe 11. The pipe sleeve 10 can act to confine and direct the incoming heat from the port chimney 12 around the pipe 11, permitting a larger area to be heated sufficiently to melt-out bitumen or other blockage material 5.

The pipe sleeve 10 of the subject invention comprises an elongated tube 2 that can comprise any of a variety of circumferential shapes, including circular, oval, square, triangular, or any other polygonal shape appropriate for surrounding one or more pipes. In addition, the length of the pipe sleeve 10 can be variable as well, depending upon the length of the pipe it will be utilized with, type of heat source, weight of the manufacturing materials, etc. A person with skill in the art would be able to determine the appropriate circumferential shape suitable for the pipes or equipment with which the pipe sleeve 10 will be utilized.

Figure 1A:
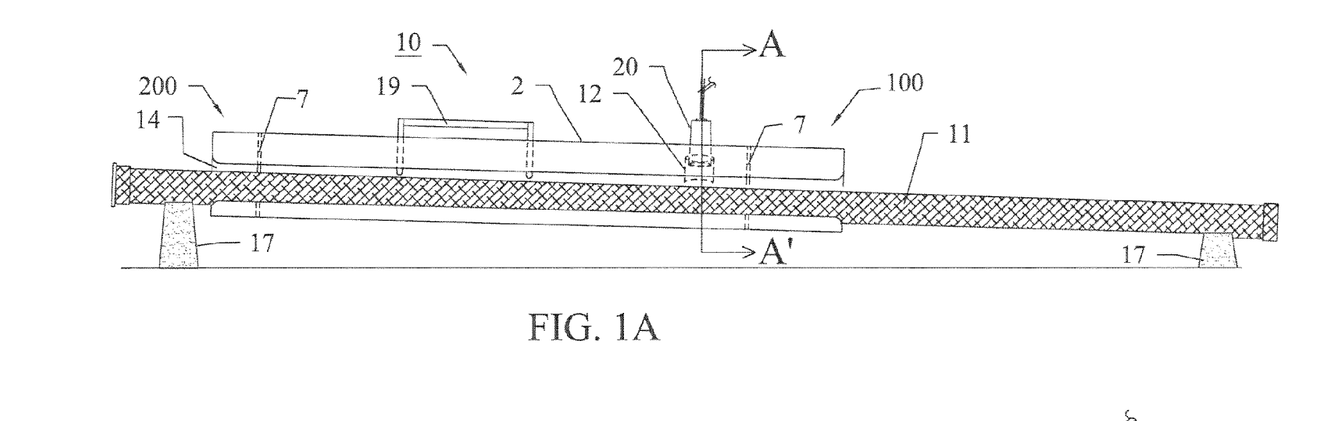
FIG. 1A is an illustration of a sleeve embodiment of the subject invention.
Figures 1B, 1C:
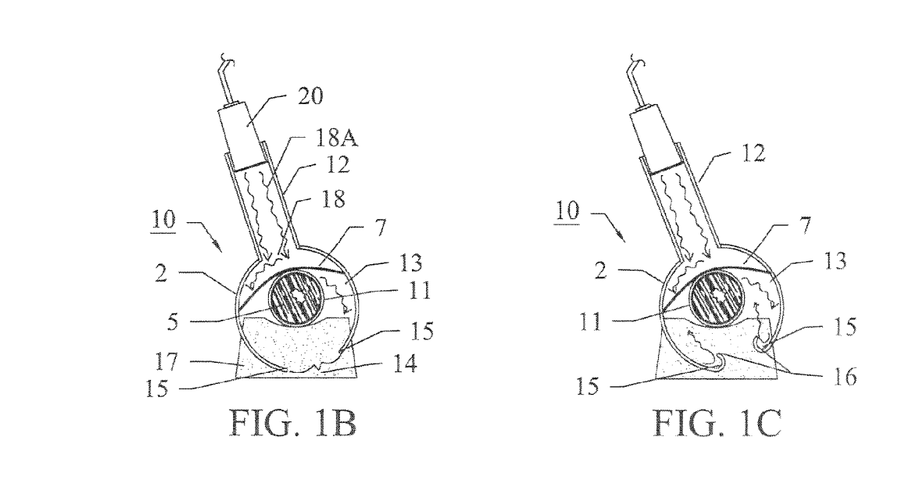
FIG. 1B illustrates a cut-away view taken along line A-A' of the heating sleeve embodiment shown in FIG. 1A.
FIG. 1C illustrates a cut-away view taken along line A-A' of FIG. 1A, showing one alternative embodiment of the heating sleeve.

In one embodiment, the pipe sleeve tube 2 comprises an essentially circular circumferential shape, for example, as shown in FIG. 1B and 1C, having a diameter sufficient to surround, but not contact, a pipe 11 and adequately direct heat against the pipe 11 to melt-out an inner blockage. In a preferred embodiment, the pipe sleeve is capable of being manipulated by hand along the length of a pipe. Thus, one embodiment comprises a pipe sleeve tube 2 approximately 2.0 feet to approximately 4.0 feet in length and has an inner diameter of approximately 3 inches to approximately 12 inches. However, it should be understood that any of a variety of larger or smaller pipe sleeve tube configurations are contemplated to be within the scope of the subject invention. For example, a pipe sleeve tube over 3.5 feet in length is well within the scope of the subject invention. Alternatively, the inner diameter of a pipe sleeve tube could be over 12 inches to accommodate larger pipe diameters or a plurality of pipes. The dimensions of a pipe sleeve tube are limited only by the ability to introduce sufficient heat into the sleeve, to position the sleeve around a pipe or a plurality of pipes, or to remove the pipe sleeve after the pipe(s) are melted-out.

In a still further embodiment, the pipe sleeve can comprise at least one handle 19 to aid in holding and manipulating the pipe sleeve. Any of a variety of handles 19 or other means for holding or manipulating the pipe sleeve can be fixedly or detachably connected to the pipe sleeve by various techniques known to those with skill in the art. In a preferred embodiment, at least a portion of the handle, or other holding means, comprises or is shielded by any of a variety of heat resistant material(s) known in the art, which are adequate to protect a person manipulating the pipe sleeve from the heat of the pipe sleeve tube.

Figure 1D:
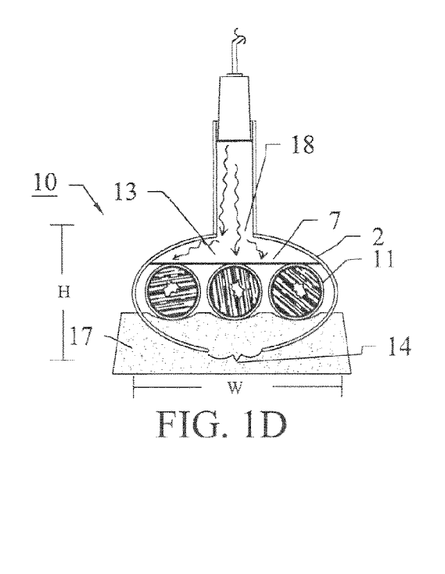
FIG. 1D illustrates a cut-away view taken along line A-A' of FIG. 1A, showing a second alternative embodiment of the pipe sleeve.

In an alternative embodiment, the pipe sleeve tube 2 can comprise a generally oval circumferential shape, for example, as shown in FIG. 1D. In this embodiment, multiple pipes can be positioned within the pipe sleeve tube 2, as shown, for example, in FIG. 1D. The oval shape can aid in confining heat around multiple pipes to more efficiently melt-out blockage material 5. In this alternative embodiment, the pipe sleeve tube 2 has an oval circumferential shape approximately 8 inches to approximately 12 inches in height (H) and approximately 12 inches to approximately 20 inches in width (W), having an overall shape such as that shown, for example, in FIG. 1D. However, as mentioned above, the dimensions of this embodiment of a pipe sleeve can also be varied and it should be understood that a person with skill in the art would be able to create alternative circumferential shapes that could accommodate one or a plurality of pipes or equipment and such alternatives are contemplated to be within the scope of this invention.

This alternative embodiment can also be designed for manipulation by a single person. Thus, this embodiment can also comprise a handle 19 to aid in holding and manipulating the pipe sleeve tube. As mentioned above, any of a variety of handles can be fixedly or detachably connected to the generally oval pipe sleeve tube by various techniques known to those with skill in the art. It may also comprise a heat resistant material capable of protecting a person while manipulating the pipe sleeve.

In one method, the pipe sleeve 10 can be positioned around a pipe by placing it over one end of the pipe and moving it along the length to the desired position. Usually, the ends of the pipe, and possibly, even some point along the length, are positioned on a support 17, preferably one that is heat resistant or heat tolerant, that permits the pipe sleeve 10 to be more easily moved along and around the length of the pipe. Thus, in this method, an end of the pipe can be temporarily raised from a support 17 in order to permit the pipe sleeve 10 to be positioned around a pipe. The pipe can then be replaced on the support, and the pipe sleeve, now surrounding the pipe, can be moved along the length of the pipe 11.

But, in an alternative embodiment, the pipe sleeve 10 further comprises a longitudinal slot 14 within the pipe sleeve tube 2, for example, as shown in FIGS. 1A-1D, that allows the pipe sleeve tube 2 to be placed over, or removed from, a pipe at almost any position on the pipe. This can eliminate the need to lift or remove the pipe from a support in order to position the pipe sleeve tube 2 over an end of a pipe. This can be advantageous, particularly after a pipe has been heated to a temperature capable of melting bitumen or another blockage.

Figure 1E:
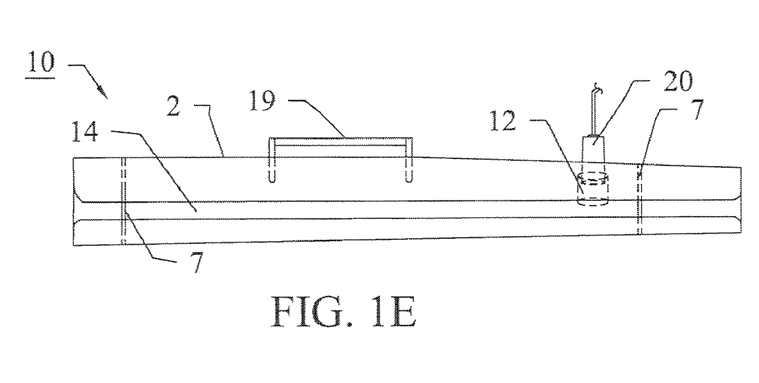
FIG. 1E illustrates an alternative embodiment of a pipe sleeve having a tapered sleeve.
Figure 1F:
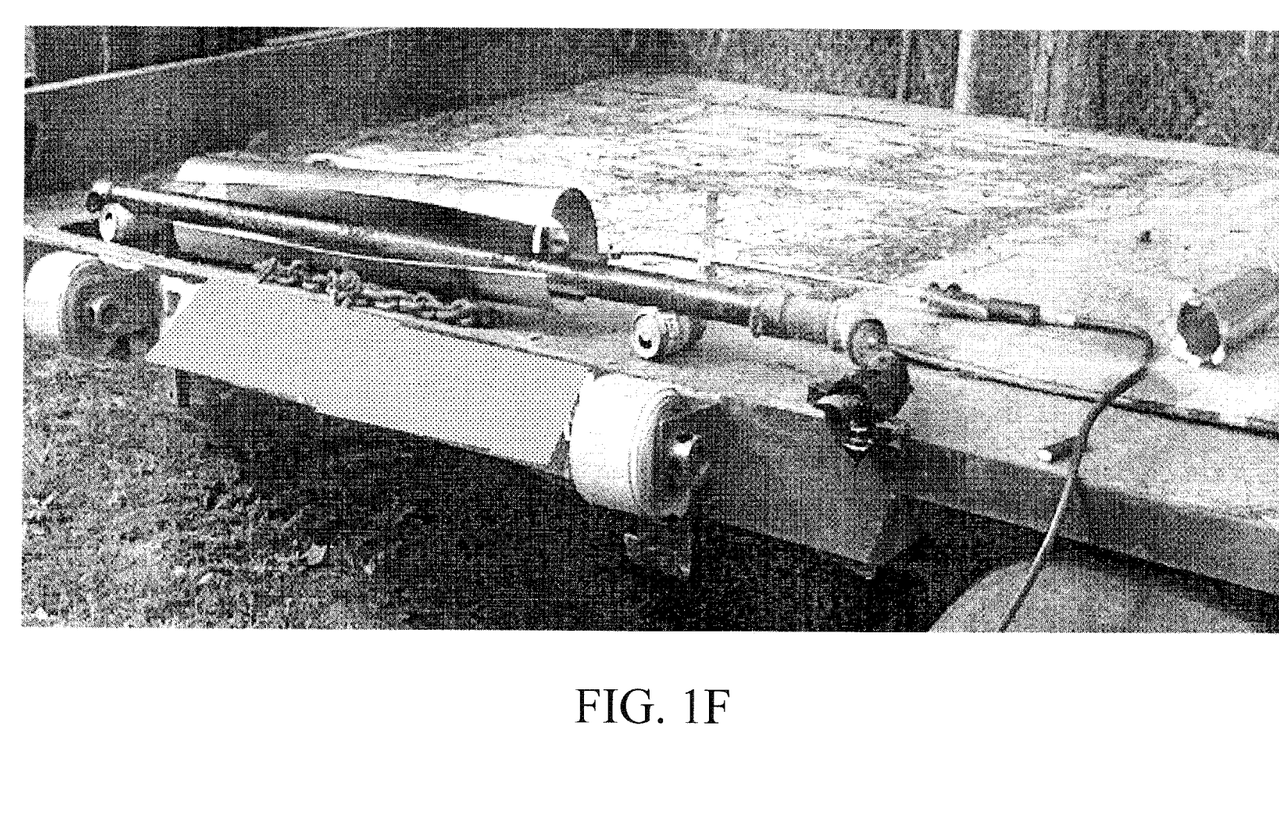
FIG. 1F is a photograph of a pipe sleeve embodiment used with a single burner head torch.

With this embodiment, shown, for example in FIGS. 1A and 1F, a pipe 11 can be placed on one or more supports 17 and the pipe sleeve 10 positioned with the longitudinal slot 14 generally parallel to the pipe, such that the pipe can be moved through the longitudinal slot 14 and into the pipe sleeve interior 13, allowing the pipe 11 to be heated and the blockage 5 evacuated without having to move the pipe from the support. The pipe sleeve 10 can then be removed from around the pipe 11 through the longitudinal slot 14 and, if desired, the pipe can be left to cool.

In a still further embodiment, the longitudinal slot 14 includes one or more convection flanges 16 affixed to or formed as part of the longitudinal slot edges 15, for example, as shown in FIG. 1C. The convection flanges 16 can be directed generally towards the pipe sleeve tube interior 13 and can direct heat that may be lost through the longitudinal slot 14 back towards the pipe sleeve interior 13. The process of continually directing heat towards the pipe sleeve tube interior 13 can help to conserve heat and maintain a consistent temperature within the pipe sleeve tube interior 13 and, thus, around a pipe. The one or more convection flanges 16 can be any variety of shapes or configurations and can be utilized on one or both longitudinal slot edges 15. For example, convection flanges 16 can be tab-like projections spaced along the length of the longitudinal slot edges 15 to direct some of the heat back to the pipe sleeve tube interior 13 and allow some of the heat to exit the longitudinal slot 14 to control the temperature within the pipe sleeve interior. This may be advantageous for certain types of heat sources, as discussed below. Other embodiments may utilize various materials for the convection flanges 16 that are capable of absorbing heat and radiating it back to the pipe sleeve interior 13. Still further embodiments, may utilize convection flanges 16 of various shapes and curvatures to more efficiently direct heat back to the pipe sleeve tube interior 13, and/or aid in the placement or removal of a pipe sleeve around a pipe. A person with skill in the art would be able to determine the appropriate configuration for one or more convection flanges 16 depending upon the heat source utilized, the size of the pipe utilized with the pipe sleeve, the circumference of the pipe sleeve, etc.

In one embodiment, a substantially continuous convection flange 16 is utilized along all or most of the length of both longitudinal slot edges 15. In a further embodiment, the convection flanges 16 are angled or curved towards the pipe sleeve interior 13 in such fashion as to facilitate the placement and removal of the pipe sleeve around a pipe, for example, as shown in FIG. 1C. In a still further embodiment, the convection flanges 16 extend into the pipe sleeve interior 13 approximately 0.5 inch to approximately 2.0 inches from the longitudinal slot edges 15.

The heat utilized with the pipe sleeve 10 can be derived from a variety of sources and, further, can depend upon the required internal temperature for the type and number of pipes within the sleeve. However, in a preferred embodiment, the interior temperature of the pipe sleeve can reach temperatures between approximately 200° F. and approximately 800° F.

For example, a kettle, e.g., an asphalt kettle, is standard equipment at most BUR work sites. Kettles can generate a considerable amount of heat that in most designs flows through a flue system within or around the kettle vat to melt the bitumen before being exhausted outside the kettle. The flue exhaust is often expelled at a temperature capable of heating pipes sufficiently to melt a bitumen blockage, often between approximately 200° F. and approximately 800° F. Directing this exhausted heat into a pipe sleeve can conserve and distribute the heat around a pipe sufficiently to melt-out blockages. A person with skill in the art would be able to determine any of a variety of techniques and methods for directing exhausted heat into a pipe sleeve, including, for example, flexible, jointed, or accordion-type tubes or conduits.

Alternatively, various heat sources could be utilized with the pipe sleeve 10 of the subject invention, including, but not limited to electrical, steam, gas, liquid fuels, etc. For example, various types of torches known in the art can be used to direct heat into the pipe sleeve. Propane flames or electric heaters could also be used to direct heat into a pipe sleeve. It would be well within the skill of a person trained in the art to realize alternative heat sources for use with an embodiment of a pipe sleeve of the subject invention, and such alternatives are contemplated to be within the scope of the present invention.

In a preferred embodiment, an industrial torch is utilized to introduce heat into a pipe sleeve of the subject invention. Industrial torches can comprise a variety of configurations that include one or a plurality of burners. Thus, in one embodiment, a pipe sleeve further comprises one or more heat ports 18 within the pipe sleeve 10 capable of accommodating any of a variety of torch styles, sizes, or configurations. Or, a further alternative is to introduce heat from one or more torches, or other heat source, into one or both ends of a pipe sleeve, depending upon the type and style of torch(es) or heat source used.

In a preferred embodiment, an example of which is shown in FIGS. 1A and 1E, heat 18A is introduced into a pipe sleeve 10 using a single torch 20. The torch can be operably connected to or directed into the sleeve such that heat is directed into a pipe sleeve through one or more heat ports 18 within the sleeve that are, preferably, large enough to accommodate the circumference of the torch burner head.

In a further embodiment, the pipe sleeve 10 comprises a single heat port 18. The heat port 18 can be at any of a variety of positions on a pipe sleeve 10. For example, in one embodiment, the heat port 18 is located in a position that is, in general, diametrically opposite the longitudinal slot 14. And, in a further embodiment, the at least one heat port 18 is positioned at or near an end of the pipe sleeve, for example, as shown in FIGS. 1A and 1E. By positioning the heat port 18 near one end of the pipe sleeve 10, the end of the pipe sleeve 10 furthest from the port chimney 12 can be tilted upward to form an angle of between approximately 5° and approximately 30° relative to the horizontal, such as, for example, as shown in FIG. 1A.

Because the heat within the pipe sleeve will rise, heat 18A entering through the heat port 12 at the lower end 100 of the sleeve will naturally be directed towards the more distant elevated end 200 of the sleeve. This can conserve heat for a longer period of time within the sleeve, allowing a larger area of a pipe therein to be melted out, which can conserve time and energy.

In a still further alternative embodiment, the pipe sleeve can be tapered or narrowed at the lower end 100 nearest the heat port 18. One example of this embodiment is shown in FIG. 1E. Tapering or narrowing the lower end 100 can reduce or prevent further heat loss from this tapered or pinched end, causing more heat to flow the longer distance towards the elevated end 200 and heating a larger section of pipe.

A further embodiment comprises one or more port chimneys 12 operably connected to the one or more heat ports 18, for example, as shown in FIGS. 1A-1D. In this embodiment, a torch burner head can be inserted into a port chimney 12. This can assist in preventing direct flames from contacting a pipe 11 positioned within the pipe sleeve 10, which can reduce or eliminate warping and surface degradation of the pipe. As discussed above, in a preferred embodiment, the pipe sleeve 10 of the subject invention comprises a single heat port 18. Thus, in a further embodiment, a port chimney 12 can be attached to the heat port 18. However, alternative embodiments can utilize multiple port chimneys 12 affixed around multiple heat ports 18 to accommodate a single torch head, moved from chimney to chimney, or multiple torch heads.

A port chimney 12 can be of variable lengths, depending, for example, on the type of heat source utilized, adjustability of the heat source, number of pipes positioned within the pipe sleeve, etc. When using a torch as the heat source, the diameter and/or length of the torch burner head, adjustability of the torch flame, and other factors known to those with skill in the art can dictate the diameter and length of a pipe chimney.

Figure 1G:
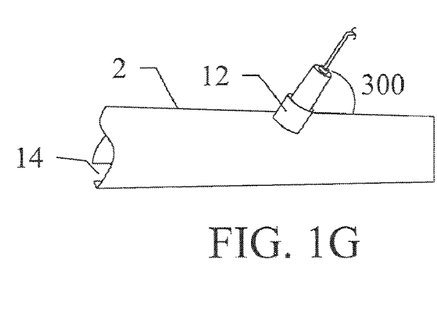
FIG. 1G illustrates an embodiment of the pipe sleeve where the port chimney is positioned at an angle, relative to the pipe sleeve.
Figure 1H:
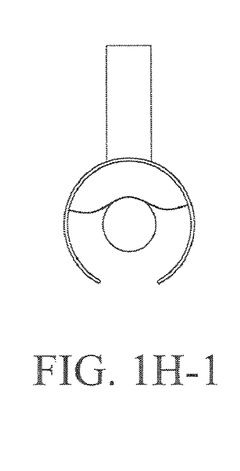
Figure 1H:
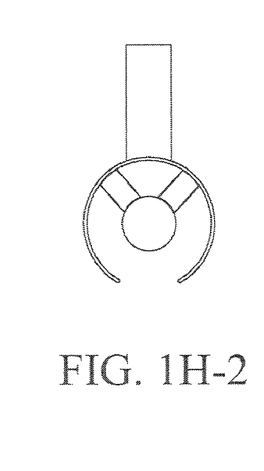
Figure 1H:
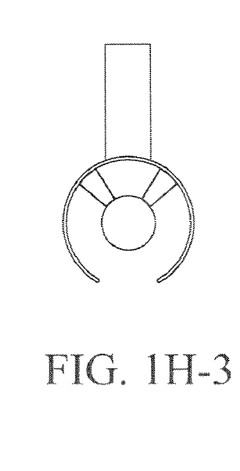
Figure 1H:
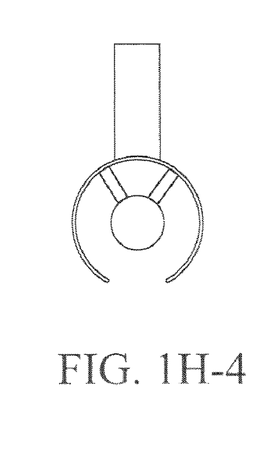

In a further embodiment, for example, shown in FIG. 1G, the port chimney 12 can be affixed at an angle 300, relative to the pipe sleeve tube 2, such that heat 18A introduced into the port chimney is directed more towards one or the other end of the pipe sleeve. In a preferred embodiment, the angle 300 of the port chimney is able to direct heat towards that end of the pipe sleeve that is furthest from the heat port 18. This can ensure that heat is maintained within the pipe sleeve for as long as possible. In one embodiment, the angle 300 of the pipe sleeve is between approximately 30° to approximately 80°. In a further embodiment, the angle 300 of the pipe sleeve is between approximately 40° to approximately 60°.

As discussed above, one embodiment utilizes a single torch burner head for introducing heat into a pipe sleeve 10 through the pipe chimney 12. In this embodiment, the diameter of the pipe chimney can be between approximately 2 inches and approximately 4 inches and have a length of between approximately 6 inches and about 10 inches. In a more specific embodiment, the pipe chimney has a diameter of between approximately 2.0 inches and approximately 3.0 inches and a length of between approximately 6.5 inches and approximately 8.5 inches.

To ensure even distribution of heat around a pipe, it can be helpful to maintain the pipe in a generally centered position within the sleeve and to prevent contact of the pipe with the interior surface of the sleeve. When manipulating the pipe sleeve along a length of pipe, the pipe sleeve 10 can be pressed against the one or more pipes within the pipe sleeve interior 13. Those, sections of a pipe that come into contact with the pipe sleeve for a length of time may not receive sufficient heat circulation, which can delay or prevent melt-out of that portion of the pipe. So, in a further embodiment, a pipe sleeve of the subject invention comprises one or more sleeve struts 7 that can traverse across or extend partially into the pipe sleeve tube interior 13. One example of a sleeve strut 7 is shown in FIGS. 1A-1D. In this embodiment, the sleeve struts 7 are positioned across the pipe sleeve tube interior 13 such that, when the sleeve is placed around a pipe, the one or more sleeve struts 7 can contact the pipe 11 preventing it from contacting the pipe sleeve 10 and ensuring that the pipe is positioned in a generally centered fashion within the pipe sleeve. In addition, it is not uncommon for pipes to become warped during field use and it may be difficult to ensure that all of a length of pipe is centered within a pipe sleeve. However, a person with skill in the art will be able to adjust the position of the pipe sleeve and/or a warped pipe to ensure even heating and melt-out.

In one embodiment, for example, as shown in FIGS. 1A-1D, a sleeve strut 7 can comprise a narrow band of heat resistant or heat radiating material. The sleeve strut can further be generally flat across the sleeve interior 13 or it can comprise any of a variety of curves, bends, or other shapes that allow it to accommodate the shape of a pipe, for example, as shown in FIG. 1H-1. In this embodiment, the sleeve strut 7 can traverse or extend into the pipe sleeve interior, between approximately ⅛ to approximately ¼ of the pipe sleeve's diameter away from, and generally perpendicular to, the port chimney 12. In a further embodiment, there are at least two sleeve struts 7 positioned at or near the ends of the pipe sleeve. In this embodiment, the one or more sleeve struts 7 can contact a pipe while the heat enters the port chimney and radiates around a section of the pipe.

However, a sleeve strut 7 of the subject invention can comprise any of a variety of shapes and configurations, depending upon the size and shape of the pipe sleeve, number of pipes that can be positioned therein, the heat source, and other relevant factors. For example, in an alternative embodiment, the sleeve struts 7 can comprise one or more generally narrow, support flanges 8 affixed to the interior wall 9 of the pipe sleeve that extend towards the pipe sleeve interior. In a further embodiment, the support flanges 8 are arranged in pairs on opposite sides of the pipe sleeve interior 13, for example, as shown in FIG. 1E. In use, the support flanges 8 are placed against at least one pipe positioned within the pipe sleeve to ensure that the pipe sleeve is consistently positioned at a preferred distance from pipes. The support flanges 8 can comprise any of a variety of shapes and configurations that will allow them to be positioned against a pipe, including curved, square, triangular, rectangular, or any other polygonal shape, for example, as shown in FIGS. 1H-2, 1H-3, and 1H-4, and such variations are contemplated to be within the scope of the subject invention.

In a further alternative embodiment, the sleeve struts 7 can be more robust and comprise one or more materials capable of transmitting heat, or at least not interfering with heat circulation around a pipe, such as for example, certain metals, ceramics, glass composites, etc. More robust sleeve struts can be preferable for use in larger pipe sleeves or with pipe sleeves having more than one heat port for use with multiple heat sources, such as multiple burner head torches.

The materials utilized for the construction of pipe sleeves can comprise a variety of heat resistant metals, ceramics, glass and plastic composites, various insulated materials, etc. In one embodiment, the pipe sleeve and its components comprise a high gauge sheet metal capable of resisting the temperatures sufficient to melt-out pipes. In a further embodiment, a pipe sleeve and its components comprise sheet metal between approximately 18-gauge and 26 gauge. In a still further embodiment, a pipe sleeve comprises a 22-gauge sheet metal. However, a person with skill in the art would be able to determine any of a variety of appropriate material or materials for constructing a pipe sleeve of the subject invention and the various components thereof. In preferred embodiments, the one or more materials utilized will be heat resistant and capable of maintaining their functional form. Further embodiments may comprise various insulating materials to conserve heat within the pipe sleeve and/or protect a pipe sleeve user.

II. Pipe Oven

Another embodiment of the subject invention comprises a pipe oven 20 capable of containing most, or all, of a length of one or more pipes for melting-out blockages. The pipe oven 20 can be operably connected to any of a variety of heat sources, via one or more heat inlets 22 that lead into the oven chamber 24. The oven chamber 24 can be divided into two or more sub-chambers 26 that allow a plurality of pipes to be distributed within the chamber to facilitate heat flow around the pipes.

Figures 2A, 2B, 2C:
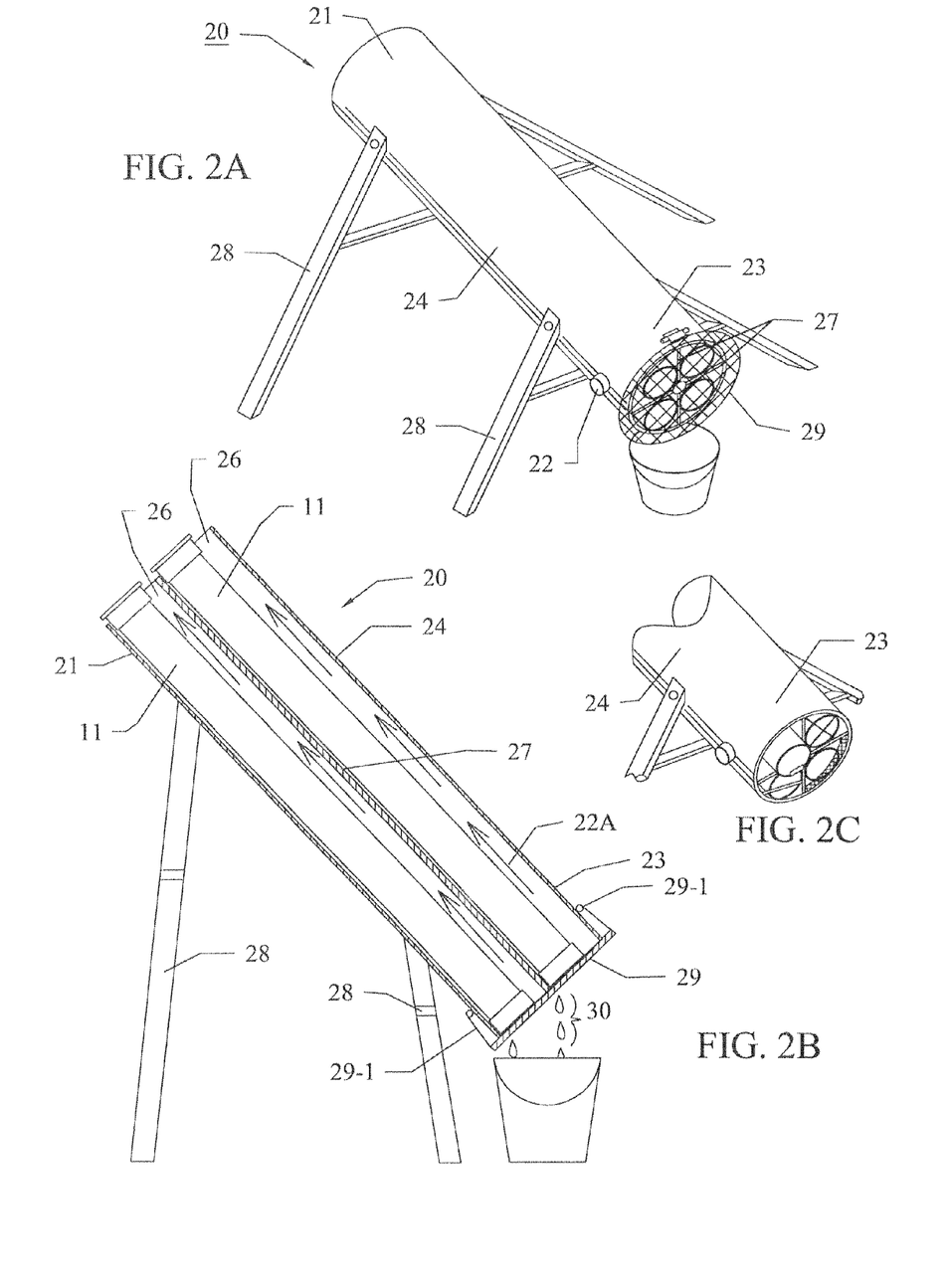
FIG. 2A is an illustration of a heating oven embodiment of the subject invention.
FIG. 2B illustrates of a cut-away side view of the embodiment shown in FIG. 2A.
FIG. 2C illustrates alternative embodiments of pipe stops that can be used with embodiments of the heating oven of the subject application.

One embodiment of the pipe oven 20 of the subject invention, shown for example in FIGS. 2A and 2B, comprises an elongated chamber 24 having a first open end, into which one or more pipes can be placed longitudinally, and a second open end to which melt-out material is directed. For example, the "thinwall" tubing often used with asphalt applications is usually available in discreet lengths of 5, 10, 15, or 20 feet, but may be available in other lengths as well. Therefore, the length of a pipe oven can vary depending upon the length(s) of thinwall tubing being utilized. In one embodiment, a pipe oven can have a length between approximately 6.5 to approximately 10 feet. In a further embodiment, a pipe oven can be between approximately 8.5 ft. and 9.5 ft. in length.

The circumferential shape of the chamber 24 can comprise any of a variety of shapes, including, but not limited to, circular, oval, square, rectangular, triangular, pentagonal, or any other polygonal shape(s), depending upon a variety of factors. In certain embodiments, the shape of the chamber 24 facilitates manufacturing, storage, transportation, and/or the creation of sub-chambers 26, as will be discussed below. In one embodiment, the chamber 24 can comprise a generally circular peripheral shape, as shown, for example, in FIGS. 2A and 2B. But, in alternative embodiment, the chamber can comprise a generally square or rectangular peripheral shape.

The chamber 24 can further comprise any of a diverse group of heat resistant or heat tolerant materials including, but not limited to, steel, iron, aluminum, or other metals, as well as clay, ceramic, glass, plastics, or combinations thereof. For example, in one embodiment, the chamber 24 comprises rolled sheet steel between approximately 18 gauge and approximately 26 gauge thickness. In a further embodiment, the chamber 24 comprises rolled sheet metal of approximately 22 gauge thickness. However, it would be well within the skill of a person trained in the art to determine an appropriate manufacturing type and dimensions of material(s) for a chamber.

In a further embodiment, all or a portion of the chamber 24 can be insulated to help retain heat within the chamber and/or reduce radiant heat to the outside of the chamber. In one embodiment, the chamber 24 comprises two or more layers of materials to retain heat within the chamber and to reduce the amount of radiant heat from the outside of the chamber. An alternative embodiment comprises two layers of material having a space or layer there between that contains air or any of a variety of gases to reduce or eliminate heat conduction. Thus, the thickness of the chamber 24 walls can vary depending upon the type of materials utilized for the manufacture of the chamber, the maximum number of pipes that may be used within the chamber, heat source, insulation properties and techniques, etc.

In a further embodiment, the chamber 24 of the pipe oven is elevated at one end such that there is an upper chamber end 21 and a lower chamber end 23. In this embodiment, as one or more pipes are melted-out, the blockage material 30 can flow towards and out of the lower chamber end 23, where it can be collected for disposal. Further, as will be discussed below, heat can be introduced at or near the lower chamber end 23 and can rise within the chamber 24 towards the upper chamber end 21. This allows heat 22A entering the chamber 24 to be conserved therein for a longer period of time, which can heat a larger length of pipe to a temperature adequate for melting-out.

In a further embodiment, one or more pipe stops 25 can be utilized to prevent one or more pipes within the oven chamber 24 from sliding out of the lower chamber end 23. FIG. 2C shows examples of pipe stop 25 that could be used with the subject invention. However, a person with skill in the art would well be able to devise any of a variety of devices capable of preventing pipes within the chamber from exiting or extending excessively from the lower chamber end, including various types of screens, cross-bars, brackets, and other supporting devices, and such variations are considered to be within the scope of the subject invention.

The interior of the chamber 24 can be further divided into a plurality of sub-chambers 26, each capable of containing one or more pipes. Utilizing sub-chambers 26 can allow a plurality of pipes within the chamber 24 to be distributed in such fashion that heat is allowed to flow around a plurality of pipes, heating them more evenly to facilitate efficient melting-out. It also allows pipes to be placed into the chamber 24 and more easily removed therefrom at differing intervals.

Thus, pipes that have completed melting-out can be removed without disturbing other pipes that may still be in the melt-out process.

There are a variety of devices and techniques that can be used to divide the chamber 24 into sub-chambers 26. In one embodiment, one or more partitions 27 can be used to subdivide the chamber 24. The partitions 27 can comprise a variety of configurations for dividing the chamber 24 into a plurality of sub-chambers 26. For example, several partitions can be utilized that can be separately inserted and/or joined, or partially joined together and inserted to form sub-chambers 26. In an alternative embodiment, the partition 27 can comprise a structure having multiple sub-chambers that can be removed as a single unit from the chamber 24. In a further embodiment, the structure can be disassembled into two or more component parts. In an alternative embodiment, the structure can comprise fixedly attached components that cannot be disassembled. A person with skill in the art would be able to determine the type of partition(s) that would be suitable for the size of the pipe oven to be utilized, the number of pipes to be inserted, material(s) utilized for the pipe oven construction, etc.

Further, sub-chambers 26 can comprise any of a variety of circumferential shapes, for example, but not limited to, circular, oval, square, triangular, pentagonal, or any other polygonal shape capable of supporting one or more pipes. The sub-chambers 24 can further be of variable length within the chamber 24, such that they may traverse the entire length of the pipe oven 20, or only a sufficient portion of it to ensure that the pipes are sufficiently separated.

In one embodiment, the partitions 27 comprise materials that will not inhibit heat and/or air flow throughout the chamber 24. Thus, in certain embodiments, the partition(s) can comprise a mesh or screen material. Alternative embodiments can utilize any of a variety of materials having a plurality of openings formed, created, or inherent therein that permit the flow of heat and/or air between sub-chambers 26.

The partitions 27 can be permanently or removably affixed to the inside of the chamber. In one embodiment, at least one partition is permanently affixed within the chamber. In a further embodiment, all of the partitions are fixed within the interior of the chamber. In alternative embodiments the partitions 27 are removably affixed to the inside of the chamber for ease of repairs and/or reconfiguration of the sub-chambers. For example, in one embodiment, the partitions are connected to one or more brackets within the chamber that can hold the partitions in the proper position after insertion into the chamber.

In a further example, the partitions can abut against one or more pipe stops 25 affixed to the lower chamber end 23. In one embodiment, shown, for example, in FIG. 2A, a pipe stop comprises a drip screen 29 located at the lower end of the chamber, as discussed above, against which partitions of the subject invention can abut. However, a person with skill in the art would be able to determine any number of devices and methods for removably affixing partition(s) within a chamber and such variations are contemplated to be within the scope of the present invention.

In one embodiment, the chamber is divided into two or more, preferably at least four, more preferably at least eight or more sub-chambers 26. Each sub-chamber is capable of containing at least one, preferably two to three pipes. In a further embodiment, the partitions 27 that define the sub-chambers 26 comprise a rigid mesh-like material capable of supporting the weight of the one or more pipes and adequately retaining a circumferential shape to permit repeated use. In a still further embodiment, the sub-chambers 26 traverse substantially the entire length of the chamber 24. This can lend support to the pipes along their entire length and reduce or prevent warping while being melted-out.

The introduction of heat 22A into the chamber 24, at a temperature sufficient to melt-out one or more pipes, can be accomplished by a variety of devices and methods. The required internal temperature of a pipe oven 20 can vary depending upon the type and number of pipes within the chamber 24. For example, in certain embodiments, the interior temperature of the chamber can range from between approximately 200° F. and approximately 800° F.

In one embodiment, the chamber 24 comprises one or more openings or heat inlets 22 through which heat can be directed. For example, a kettle, e.g., an asphalt kettle, is standard equipment at most BUR work sites. Such kettles can generate a considerable amount of heat that in most designs flows through a flue system within the kettle to melt the surrounding bitumen before being exhausted via one or more flues to the outside of the kettle. The flue exhaust is often at a temperature capable of heating pipes sufficiently to melt a bitumen blockage, often between approximately 200° F. and approximately 800° F. This exhausted heat can be directed through one or more heat inlets 22 into a pipe oven chamber 24, by various methods known to those with skill in the art can conserve and distribute the heat around one or more pipes sufficiently to melt-out blockages.

Alternative heat sources can also be utilized with the pipe oven 20 and heat inlet(s) 22 of the subject invention, including, but not limited to electrical, steam, gas, liquid fuels, etc. For example, various types of torches known in the art can be used to direct heat into the chamber 24. Propane flames or electric heaters could also be used to direct heat into a pipe oven. And, it would be well within the skill of a person trained in the art to realize alternative heat sources for use with an embodiment of a pipe oven 20 of the subject invention, and such alternatives are contemplated to be within the scope of the present invention.

In a further alternative embodiment, one or more industrial torches are utilized to introduce heat into a pipe sleeve of the subject invention. Industrial torches can comprise a variety of configurations that include one or a plurality of burners. Thus, in one embodiment, the chamber 24 further comprises one or more heat inlets 22 within the chamber 24 sized and arranged to accommodate any of a variety of torch styles. Or, a further alternative would be to introduce heat from one or more torches into one or both ends, preferably the lower chamber end 23 of a pipe oven, depending upon the type and style of torch(es) used.

In a still further embodiment, heat is introduced into a pipe oven 20 using a single torch 20. The torch or the heat therefrom can be directed into a chamber 24 through one or more heat inlets 22 that are, preferably, sized and arranged along or around the chamber 24 to accommodate the circumference of the torch burner head.

In one embodiment, the pipe oven 20 chamber 24 comprises a single heat inlet 22 through which heat can be directed. The heat inlet 2 can be at any of a variety of positions on a pipe oven 20 chamber. But, in a further embodiment, the heat inlet 2 is located, at or near the lower chamber end 23, as shown, for example, in FIG. 2A.

Thus, in a still further embodiment, where the heat inlet 22 is located at or near the lower chamber end 23, the opposite end or upper chamber end 21 can be tilted upward at an angle from approximately 5° to approximately 90°. This allows heat 22A entering through the heat inlet to flow towards the upper chamber end 21, for example, as shown in FIG. 2B, which can conserve heat for a longer period of time within the chamber and melt-out a larger length of pipe(s). It can also speed the flow of melt-out material from the lower chamber end.

Elevating one end of the pipe oven 20 chamber 24 can necessitate securing pipe(s) within the chamber so that they don't slide out of the lower chamber end 23. This can be accomplished by a variety of devices and methods. For example, many types of thinwall tubing have tie back eyes or control loops at one end. These and other fixtures that may already be existent on a pipe can be used to hold a pipe securely by wedging or placing it against various supports. For example, in one embodiment the tie back eye of thinwall tubing can be placed against one or more edges of partition(s) 27 within the chamber 24 to prevent them from sliding out. Alternatively, various brackets, clamps, sleeves, latches, or other devices known to those with skill in the art, etc. can be fixed to the end of a pipe before positioning it within the chamber 24 and used to secure the end of the pipe so it can't slide out the lower chamber end 23.

In an alternative embodiment, the lower chamber end 23 has connected thereon a drip screen 29, for example, as shown in FIGS. 2A and 2B. A drip screen 29 can be permanently or removably attached across the opening at the lower chamber end 23. By way of example, a drip screen 29 can be affixed to the lower chamber end 23 by one or more clamps 29-1. This can allow the drip screen to be removed for cleaning and/or permit access to the lower chamber end 23, if necessary. Thus, in a preferred embodiment, the mesh or openings in the drip screen 29 are sufficiently large to permit pipes to melt-out of the lower chamber end 23 such that the bitumen drip 30 is generally unhindered, as shown, for example, in FIG. 2B.

In one embodiment, the pipe oven 20 can be connected to and/or supported by a variety of devices. For example, in one embodiment, a pipe oven 20 can be connected to a trailer or other transportable equipment for movement to a location. In a specific example, one or more pipe ovens 20 could be permanently or demountably affixed, to an asphalt kettle for convenient transportation and/or support. In this embodiment, the radiant heat absorbed from the kettle, as well as heat from the kettle flue(s) can be directed into one or more heat inlets 22, as described above.

In one alternative embodiment, shown, for example, in FIG. 2A, the pipe oven 20 is a stand-alone piece of equipment that can be set up in a variety of locations. In this embodiment, the pipe oven 20 can comprise any of a variety of one or more supports, mounts, stands, etc. known to those with skill in the art. In an embodiment, one or more of the leg stands 26 can be permanently or demountably affixed to the pipe oven, as shown, for example, in FIG. 2A. Further, one or more of the leg stands can be collapsible, foldable, retractable or otherwise movable or adjustable. In a still further embodiment, the pipe oven 20 can comprise two or more leg stands 26 of different heights which can permit the pipe oven 20 to be tilted, as discussed above.

In a preferred embodiment, the pipe oven of the subject invention comprises at least two leg stands 26 having different heights, as shown, for example, in FIG. 2A. This permits the pipe oven to be supported above a surface and at an angle.

III. Kettle Conduits

Yet another embodiment of the subject invention comprises modified kettles having one or more conduits that traverse through the interior of a kettle, including, but limited to, through and/or around a kettle's material vat. In this embodiment, the melted bitumen 5A within the material vat of the modified kettle provides sufficient heat to penetrate the walls of the one or more kettle conduits. The radiant heat within the kettle conduits can be sufficient to melt-out one or more pipes positioned therein. Kettles are usually available in a variety of sizes and configurations that can contain various amounts of bitumen from approximately 30 gallons to hundreds of gallons. Thus, embodiments of this invention include kettle conduits 41 traversing large and small kettles and having various sizes and shapes of material vats, shells and frame designs.

In preferred embodiments, a kettle conduit 41 of the subject invention is sealed against contact with the contents of a modified kettle's material vat. Thus, the heat provided to the kettle conduit is radiant heat from the heated contents of the material vat. But, the pipe within the kettle conduit will, preferably, at no time come into direct contact with the material vat contents.

In an alternative embodiment, the flue exhaust can be directed into a kettle conduit to provide heat for warning or melting-out a pipe therein. In this embodiment, any of a variety of techniques and devices can be utilized to direct the flue exhaust into a kettle conduit.

Certain embodiments of the subject invention include a modified kettle 40 comprising at least one kettle conduit 41. However, alternative embodiments comprise a modified kettle 40 having more than one kettle conduit 41, as shown, for example, in FIGS. 3A and 3B. Further alternative embodiments comprise kettle conduits 41 designed to hold more than one pipe. In this embodiment, shown for example in FIG. 3C, an enlarged kettle conduit 42 can contain two or more pipes. And, in alternative embodiments, the enlarged kettle conduits 41 can include one or more sub-conduits. While not required, the use of sub-conduits can allow a plurality of pipes within a kettle conduit 41 to be distributed in such fashion that heat is allowed to flow around the pipes, which can allow more even heating to facilitate efficient melting-out. It also allows pipes to be placed into the kettle conduits and more easily removed there from at differing intervals. Thus, pipes that have completed melting-out can be removed without disturbing other pipes that may still be in the melt-out process.

It is known in the art that most manufacturers utilize high-heat resistant heavy gauge steels for the material vats 40A and other structures, including the flue unit, of kettles. Thus, the kettle conduits 41 of the subject invention can generally comprise the same materials utilized for the manufacture of kettles. Therefore, in a certain embodiments, the one or more kettle conduits 41 of the subject invention are constructed of steel sheet metal between approximately 12 gauge and approximately 20 gauge. However, a person with skill in the art would readily recognize other materials that may be suitable for constructing the kettle conduits of the subject invention. For example, materials such as iron, copper, or other metals, ceramics, heat-resistant plastics or polymers, various heat resistant, high-impact glass composites, or other variations or composites thereof, etc. could be used for the manufacture of the kettle conduits of the subject invention and are contemplated to be within the scope of the subject invention.

Kettle conduits 41 can be positioned to traverse the length (generally, front to back) and/or width (generally, side to side) of a kettle, such that the ends of the kettle conduits open to the outside of the bitumen kettle. Alternative embodiments may position one or more kettle conduits at an angle relative to the length or width of the kettle. In a preferred embodiment, shown for example, in FIG. 3A, the kettle conduits traverse the length of a kettle, from front to back. In many kettle designs, this configuration can provide longer conduits to accommodate longer pipes. However, in other kettle designs it may be more advantageous to configure conduits along the width, side to side, of the kettle, which can accommodate shorter lengths of pipe.

The position of the kettle conduits 41 relative to the material vat 40A can also vary depending upon the size and type of kettle. For example, to maximize heat retention, many kettles have a double-walled construction with any of a variety of "R" factor insulation in between. FIG. 3B illustrates a cross-section of a standard double-wall kettle having an inner wall 44 and an outer wall 45, with insulation 46 between. In one embodiment, one or more peripheral kettle conduits 47 are positioned to traverse the length of a kettle between the inner wall 44 and the outer wall 45, penetrating through the interior insulation 46, for example, as shown in FIG. 3B. In a further embodiment, the peripheral kettle conduits 47 are positioned relatively close, perhaps in contact with, the inner wall 44, which can increase the amount of heat radiating into the one or more conduits. This can also advantageously increase the amount of insulation between a peripheral kettle conduit 47 and the outer wall 45.

In an alternative embodiment, the kettle conduits can comprise part of a kettle conversion kit 50 that can be retroactively fitted to a kettle. A kettle conversion kit 50 could comprise any number of kettle conduits, and can be fit onto one or more sides of a kettle. For example, FIG. 3B illustrates an example of a kettle conversion kit 50 having at least three kettle conduits fixed within a shell and surrounded with appropriate insulation. In this embodiment the outer wall 45 of a kettle can be breached and the kettle modification kit 50 inserted and fixed within the breach, preferably positioned against or near the interior wall 44.

Figure 3A:
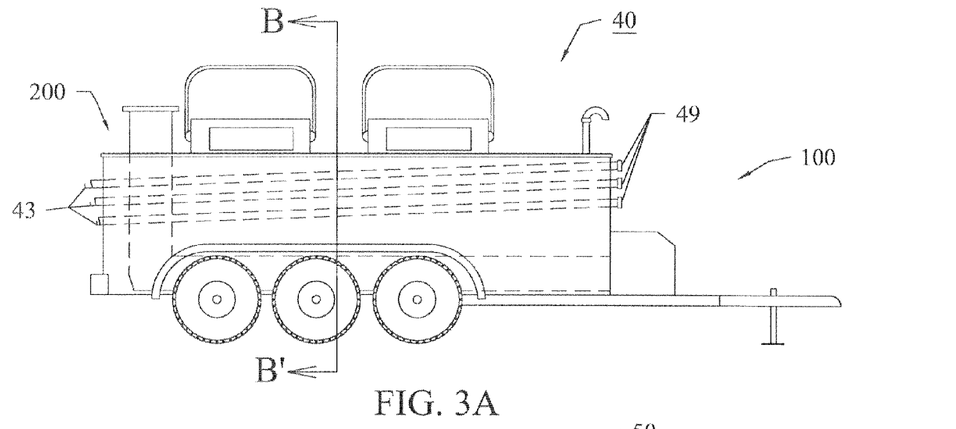
FIG. 3A is an illustration of a kettle modified to comprise multiple kettle channel devices of the subject invention.
Figure 3B:
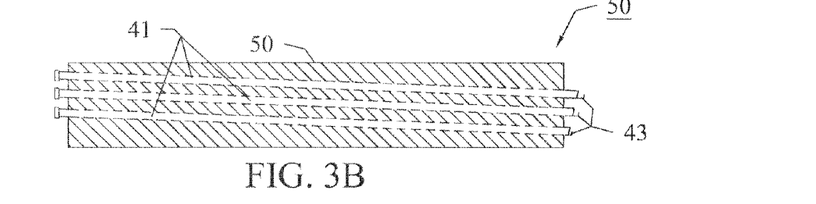
FIG. 3B illustrates an embodiment of a kettle conversion apparatus.
Figure 3C:
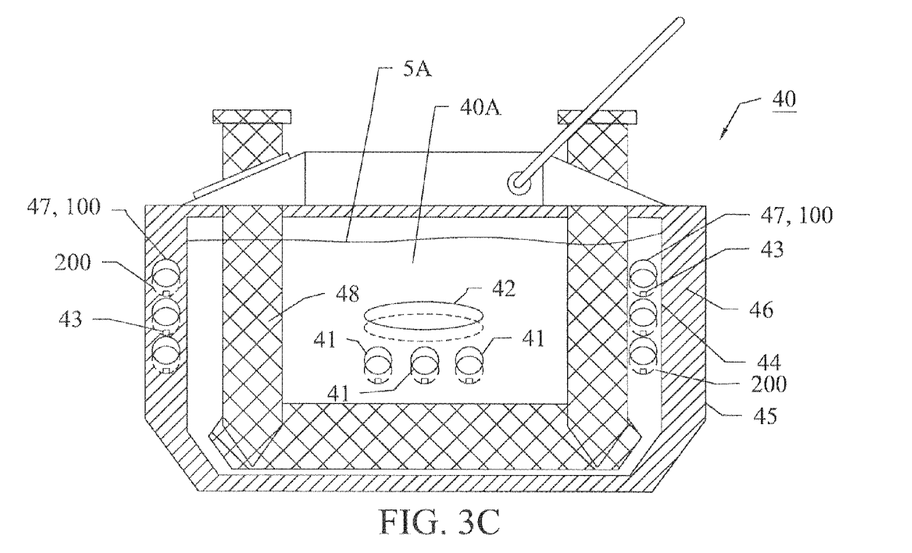
FIG. 3C illustrates a cut-away view taken along line B-B' of the embodiment shown in FIG. 3A.

A further embodiment of the subject invention utilizes kettle conduits 41 that traverse through the interior of a kettle's material vat 40A, as shown for example in FIG. 3C, such that ends of the kettle conduits open to the outside of the bitumen kettle. In this embodiment, the one or more kettle conduits 41 can be all or partly submerged and heated by the melted bitumen 5A within the material vat 40A. As shown in FIG. 3C, one or more kettle conduits can be positioned through the material vat and around the interior flue unit 48. Thus, as the level of bitumen material fluctuates, pipes can be positioned within appropriate kettle conduits 41 that remain sufficiently heated. However, one alternative method utilizes kettle conduits having lower internal heat, to begin the heating of pipes, which can then be moved to hotter kettle conduits as space permits.

A further embodiment comprises kettle conduits 41 that are angled to more easily direct melt-out flow. For example, in the embodiment comprising a kettle conversion kit 50, the kettle conduits 41 can be positioned within the shell at an angle from approximately 5° to approximately 45°. In this embodiment, heat within the kettle conduit will rise to the upper end 100 of the conduit, while melted bitumen will be directed towards the lower end 200 of the conduit. Thus, when the kit is installed into or against the side of a kettle the internal kettle conduits will be at an appropriate angle to ensure that melted bitumen material flows out of the pipes in a desired direction.

Other embodiments can also utilize angled kettle conduits that direct heat to the upper end 100 and melted bitumen to the lower end 200. In most instances, the lower end 200 of the kettle conduit, from which melted bitumen flows, would be directed towards an end of the kettle away from the engine, but this may not be a necessary requirement for all models. In light of this disclosure, a person with skill in the art would well be able to determine the appropriate angle and direction of flow for any of a variety of kettles.

In still further embodiments, the ends of kettle conduits from which bitumen flows out of are offset, for example, as shown in FIG. 3A, such that the ends of higher kettle conduits project past the ends of kettle conduits below. This prevents bitumen from dripping onto the ends of lower pipes. In a yet further embodiment, the lower end 200 of a kettle conduit further comprises one or more pipe stops 43 affixed to the end of the kettle conduit that prevent a pipe within an angled kettle conduit from sliding completely down and out of the lower end 200 of the kettle conduit.

The diameter of the kettle conduits 41 can also vary depending upon the size and type of pipes utilized. For example, the kettle conduits can comprise a variety of shapes including, but not limited to, circular, oval, square, rectangular, triangular, or any other polygonal shape. In a preferred embodiment, the kettle conduits comprise a generally circular circumferential shape, which is usually compatible with the circumferential shape of the thinwall pipes most often used with bitumen kettles.

The size of the kettle conduits can also vary depending upon the size of the pipes and the length of the kettle. The standard, thinwall tubing most often utilized with bitumen kettles has a 1.5" diameter. Therefore, kettle conduits can be of almost any diameter larger than the standard pipe diameter. However, it is not uncommon for tubing to become warped or bowed during use. Therefore, it can be advantageous for kettle conduits to have a diameter not only large enough to accommodate the diameter of a pipe, but, perhaps, to also accommodate some amount of pipe bowing. The diameter of a kettle conduit can also be affected by the expected amount of heat loss that will accompany larger diameter kettle conduits. So, a balance must be found between accommodating pipes of different diameters or variable shape and maintaining sufficient heat within a kettle conduit to affect melt-out. Thus, in one embodiment, the diameter of a kettle conduit is approximately 2.0 inches to approximately 8.0 inches.

One embodiment further utilizes conduit caps 49 that can be affixed to one end of a kettle conduit. A conduit cap 49 affixed to the end of a kettle conduit can aid in retaining heat inside the conduit. In one embodiment mentioned above, a kettle conduit is angled to direct the flow of bitumen towards the lower end. A consequence of this is that heat will naturally rise towards and out of the higher end. Utilizing one or more conduit caps 49 can reduce or eliminate the flow of heat from the higher end of a kettle conduit. In a further embodiment, conduit caps can be insulated to further aid in reducing heat loss. And, in a still further embodiment, conduit caps can have one or more openings that can be opened and/or closed to help regulate the heat loss and the temperature inside the kettle conduits.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A pipe sleeve comprising:
a pipe sleeve tube having a tapered end;
a longitudinal slot traversing the length of the pipe sleeve tube;
at least one heat port within the pipe sleeve tube, wherein the at least one heat port is located closer to the tapered end of the pipe sleeve tube and at least one port chimney affixed to the at least one heat port at an angle of between approximately 30° and 80° to direct heat towards the end of the sleeve furthest from the heat port.

2. The pipe sleeve, according to claim 1, wherein the at least one heat port is positioned generally diametrically opposite the longitudinal slot.

3. The pipe sleeve, according to claim 1, further comprising at least one handle affixed to the pipe sleeve tube.

4. The pipe sleeve, according to claim 1, further comprising at least one sleeve strut.

5. The pipe sleeve, according to claim 4, further comprising at least one sleeve strut at or near each end of the pipe sleeve tube.

6. The pipe sleeve, according to claim 1, further comprising at least one convection flange.

7. The pipe sleeve, according to claim 1, wherein the pipe sleeve tube further comprises at least one support flange.

8. The pipe sleeve, according to claim 7, further comprising at least two support flanges located at or near each end of the pipe sleeve tube.

9. The pipe sleeve, according to claim 1, wherein the pipe sleeve tube comprises 22 gauge steel sheet metal.

10. The pipe sleeve, according to claim 1, wherein the pipe sleeve comprises a generally circular circumferential shape.

11. The pipe sleeve, according to claim 1, wherein the pipe sleeve comprises a generally elliptical circumferential shape.

12. A kit comprising:
a torch;
at least one pipe support; and
a pipe sleeve comprising:
a pipe sleeve tube having a tapered end;
a longitudinal slot traversing the length of the pipe sleeve tube;
at least one heat port within the pipe sleeve tube, wherein the at least one heat port is located closer to the tapered end of the pipe sleeve tube and
at least one port chimney affixed to the at least one heat port at an angle of between approximately 30° and 80° to direct heat towards the end of the sleeve furthest from the heat port.

13. A method for heating a pipe utilizing a pipe sleeve comprising:
a pipe sleeve tube having a tapered end;
a longitudinal slot traversing the length of the pipe sleeve tube;
at least one heat port within the pipe sleeve tube, wherein the at least one heat port is located closer to the tapered end of the pipe sleeve tube, and
at least one port chimney affixed to the at least one heat port at an angle of between approximately 30° and 80° to direct heat towards the end of the sleeve furthest from the heat port,
wherein said method comprises positioning a pipe so that at least one end is raised from a surface, placing a heat source adjacent to the at least one heat port, passing the pipe sleeve tube over the pipe through the longitudinal slot, so that the pipe is positioned within the interior of, and generally parallel to, the longitudinal length of the pipe sleeve tube, and moving the pipe sleeve parallel to the length of the pipe until the pipe is sufficiently heated.

14. The method, according to claim 13, wherein the heat source placed adjacent to the heat port is a torch.

15. The method, according to claim 13, where the pipe sleeve further comprises at least one handle affixed to the pipe sleeve tube.

* * * * *